Patented Aug. 30, 1938

2,128,290

UNITED STATES PATENT OFFICE 2,128,290

BOND FOR MINERAL OR ROCK WOOL

Albra H. Fessler, Flint, Mich., assignor to General Motors Corporation, Detroit, Mich., a corporation of Delaware No Drawing. Application November 8, 1935, Serial No. 48,903

6 Claims. (Cl. 210—204)

This invention relates to oil filters and is particularly concerned with a binder to hold together a filtering material composed of rock wool or mineral wool so that the wool may be suitably molded and retained in its molded condition by the binder.

In filtering the oil used to lubricate the internal combustion engines of automotive vehicles, it has been found that it is desirable to use rock wool or mineral wool, but in its ordinary commercial state the finer filaments or threads of the wool become loose and fall to the bottom of the container, or there is also the possibility that the filaments will pass through the filter and reach the bearing parts. It has therefore been found necessary to encase the rock or mineral wool in suitable fine cloths to hold the wool in shape. Rock wool and mineral wool are made from silicious rock or silicious slag and may be termed silica wool or silica cotton.

In making experiments with rock or mineral wool it was found that the wool could be formed to a desired shape by first mixing it with a suitable binder and then molding it to the proper form. The binder preferably was in the liquid state and after the wool had been molded it was suitably treated such as by placing it in an oven to drive off the moisture. The resulting product was a hard porous mass which retained its own shape and did not need any cloths to retain the particles in the mass.

Considerable experimentation was made with various types of binders to find one which was most adaptable for the purpose. These binders for the most part may be added in the liquid form as solutions, or if desired they may be mixed with the wool while the binder is in the powdered state, the mixing being done in any suitable mechanical mixer. Water is later added to make the mass more pliable and to facilitate molding.

The amount of binder used depends upon the hardness desired for the finished product and the amount of liquid to be added depends upon the molding characteristics of the mix or the mass. It is preferable to add enough liquid so that the mix will mold as in dry pressing, and in the pressing operation there will not be pressed out any excess liquid. In this condition the mixed mineral or rock wool can be hand tamped or pressed by mechanical means into a mold of the desired shape under relatively low pressures.

After pressing to shape and removal from the mold, the shaped article will require drying to drive the moisture of the binder out of the filtering element.

In my experiments I found that the most suitable binder is one made of a water soluble starch such as potato or wheat starch and which may be termed a "cold water paste." This binder is desirable for the reason that it is readily obtainable, is inexpensive, can be readily molded when mixed with the mineral wool, readily allows the moisture to be driven off, maintains the mineral wool in its molded shape when dried, does not interfere with the filtering of the oil, and will not deteriorate or lose its function as a binder while the oil passes through the filter.

The preferred manner or method of making the mix is by weighing out a definite quantity of wool, then to weigh out the proportionate amount of dry, powdered binder, measure out the necessary and proportionate amount of water, then mix the powdered binder and water to a solution almost as thin as water, and then mix the solution and the wool. For practical purposes, about 600 cc. of water mixed with substantially 20 grams of cold water paste produces a suitable binder.

One form of the filter to which the invention is adaptable is shown in the McKinley Patent 1,940,316, and another form is seen in the Kamrath application Ser. No. 34,757. Instead of the filtering material shown in the McKinley patent, the filtering unit or spool thereof is supplied with the molded mineral or rock wool of the present invention.

I claim:

1. In an oil filter, a solid and self-sustaining filtering element composed of mineral wool and a binder comprising a cold water paste, said binder acting to hold the wool together, said mineral wool and binder being intermixed.

2. In an oil filter, a filtering element comprising a hard porous mass of mineral wool, said element having a binder composed of a water soluble starch, said mineral wool and binder being intermixed.

3. The method of making a hard porous oil filter element consisting of intermixing mineral wool with a cold water paste made of water soluble starch comprising wheat starch, then forming the mixed mass to shape, and then drying the mass to drive off the water.

4. The method of making a hard, porous oil filter element consisting of intermixing mineral wool with a dry powdered water soluble starch, then in adding water to make a molded mass, then in shaping the mass to the form of the desired filter element, then in drying the element to drive off the water and leave a hard porous formed element.

5. The method of making a hard, porous oil filter element consisting of intermixing a definite quantity of mineral wool with a soluble binder comprising a cold water paste having substantially definite proportions of water and paste, forming the mixture into a definite shape, and then drying the shaped element to drive off the water.

6. The method of making a hard porous oil filter element consisting of intermixing mineral wool with a cold water paste made of water soluble starch comprising potato starch, then forming the mixed mass to shape, and then drying the mass to drive off the water.

ALBRA H. FESSLER.